United States Patent
Honguh et al.

(10) Patent No.: US 6,344,928 B1
(45) Date of Patent: Feb. 5, 2002

(54) DISPLAY DEVICE

(75) Inventors: Yoshinori Honguh, Yokohama; Masataka Shiratsuchi, Kawasaki; Yuzo Hisatake; Yoshinori Higuchi, both of Yokohama; Nozomu Harada, Fukaya, all of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 61 days.

(21) Appl. No.: 09/599,897

(22) Filed: Jun. 23, 2000

Related U.S. Application Data

(63) Continuation of application No. PCT/JP99/05861, filed on Oct. 22, 1999.

(30) Foreign Application Priority Data

Oct. 23, 1998 (JP) ............................................ 10-302438
Nov. 20, 1998 (JP) ............................................ 10-331139

(51) Int. Cl.⁷ .......................... G02B 27/10; G02B 3/08; G02F 1/1335
(52) U.S. Cl. ....................... 359/621; 359/622; 359/741; 349/57; 349/95
(58) Field of Search ..................... 349/57, 95; 359/456, 359/457, 621, 622, 741, 742, 802

(56) References Cited

U.S. PATENT DOCUMENTS

| 5,187,599 A | * | 2/1993 | Nakanishi et al. | 349/95 |
| 5,206,761 A | * | 4/1993 | Ogino | 359/457 |
| 5,355,187 A | * | 10/1994 | Ogino et al. | 353/38 |
| 5,504,598 A | * | 4/1996 | Sprague et al. | 349/57 |
| 5,608,551 A | * | 3/1997 | Biles et al. | 349/95 |
| 5,751,387 A | * | 5/1998 | Iigahama et al. | 349/95 |

FOREIGN PATENT DOCUMENTS

| JP | 57-207217 | 12/1982 |
| JP | 59-223410 | 12/1984 |
| JP | 62-71920 | 4/1987 |
| JP | 63-314519 | 12/1988 |
| JP | 2-77726 | 3/1990 |
| JP | 2-195321 | 8/1990 |
| JP | 5-188340 | 7/1993 |
| JP | 6-324205 | 11/1994 |
| JP | 8-146455 | 6/1996 |
| JP | 10-253920 | 9/1998 |

* cited by examiner

Primary Examiner—Georgia Epps
Assistant Examiner—David N. Spector
(74) Attorney, Agent, or Firm—Pillsbury Winthrop LLP

(57) ABSTRACT

An object of the present invention is to provide a display device which can realize a magnified image. A display device comprises a display panel having a predetermined effective display region PS, a display screen, and a magnifying optical system including a first inverting optical system constituted by a first lens array in which a plurality of first lenses corresponding to the display panel are arrayed and a second inverting optical system constituted by a second lens array in which a plurality of second lenses corresponding to the first lenses are arrayed. The magnifying optical system constitutes a plurality of channels for forming on the display screen a magnified erect image for a display image on the display panel through the corresponding first and second lenses. The magnifying optical system is constructed so as to form on the display screen an image of an image point on the display panel through at least three of the channels.

21 Claims, 8 Drawing Sheets

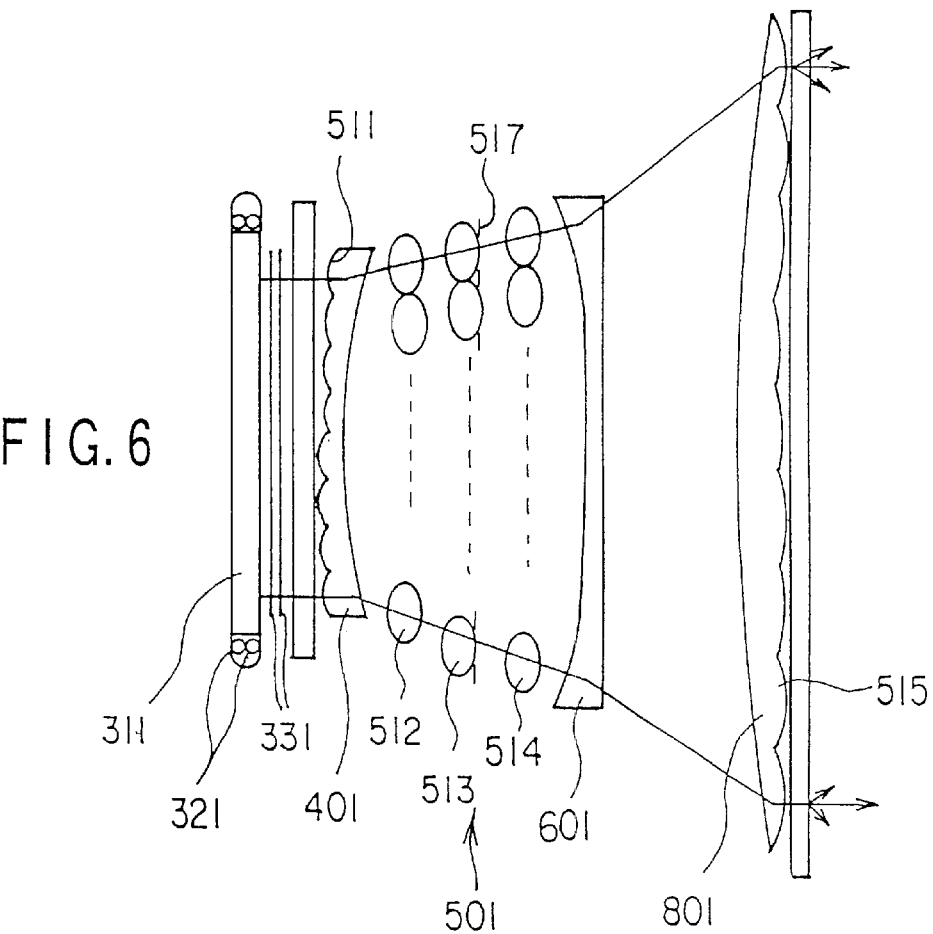
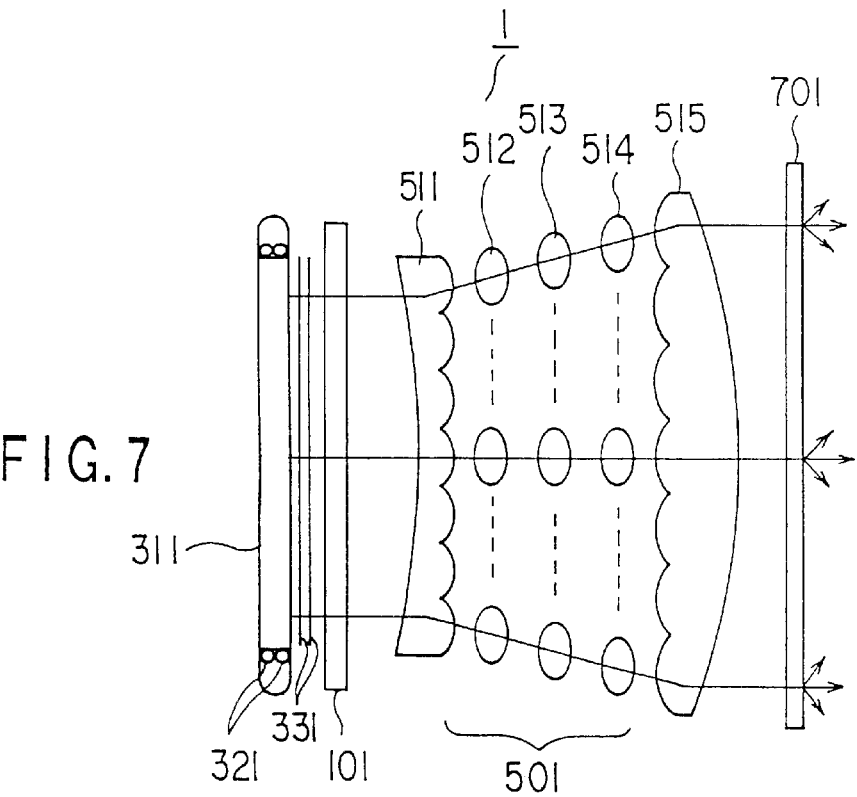

DISPLAY DEVICE

CROSS-REFERENCE TO RELATED APPLICATIONS

This is a Continuation of Application PCT/JP99/05861, filed Oct. 22, 1999.

This application is based upon and claims the benefit of priority from the prior Japanese Patent Applications No. 10-302438, filed Oct. 23, 1998; and No. 10-331139, filed Nov. 20, 1998, the entire contents of which are incorporated herein by reference.

BACKGROUND OF THE INVENTION

The present invention relates to a display device, and particularly to a direct-view-type display device which can provide a satisfactory display image in a wide area.

A flat display apparatus represented by a liquid crystal display device has been utilized in various fields, making the most of the characteristics of lightweight, small thickness and low power consumption. In particular, the liquid crystal display device is mainly used in portable information equipment represented by a personal computer.

Such a liquid crystal display device uses an insulating substrate made of, for example, glass. However, due to restrictions on the substrate or the apparatus, it has been difficult to realize a large display region of 20 inches or more.

A technique for forming a large display area by adhering together a plurality of liquid crystal display panels is known from, for example, Jpn. Pat. Appln. KOKAI Publication No. 8-146455.

However, a large display screen formed by adhering display panels as described above has required improvement, since joints are visible.

Under the circumstances, a technique disclosed in, for example, Jpn. Pat. Appln. KOKAI Publication No. 5-188340 or 10-253920 is known.

Jpn. Pat. Appln. KOKAI Publication No. 5-188340 discloses a combination of a cylindrical rod lens array for forming an erect life-size image and a Fresnel lens to obtain a magnified image. However, as indicated in Jpn. Pat. Appln. KOKAI Publication No. 10-253920, lightweight and low cost cannot be realized. In addition, a sufficient magnification in a short optical path cannot be satisfied.

On the other hand, Jpn. Pat. Appln. KOKAI Publication No. 10-253920 discloses a technique for realizing a lightweight and inexpensive magnifying optical system by arranging a field lens at an inverted image position between a pair of image-forming lens arrays and an aperture stop between the lens arrays. In other words, superposition of images projected through the lenses between the lens arrays is controlled to a relatively small extent by means of the field lens and the aperture stop, thereby preventing discontinuity of images and realizing uniform display brightness.

However, in the techniques described above, since it is necessary to shield most part of light by the aperture stop, reduction of the brightness of the device as a whole cannot be avoided.

BRIEF SUMMARY OF THE INVENTION

The present invention was made to cope with the technical problems described above. Accordingly, its object is to provide a compact display device which can realize a sufficiently magnified image and obtain high display brightness.

The present invention, made on the basis of the above problems, resides in a display device comprising: a display panel having a predetermined effective display region; a display screen having an image display region larger than the effective display region of the display panel; and a magnifying optical system arranged between the display panel and the display screen and including a first inverting optical system constituted by a first lens array in which a plurality of first lenses corresponding to the display panel are arrayed and a second inverting optical system constituted by a second lens array in which a plurality of second lenses corresponding to the first lenses are arrayed, the magnifying optical system constituting a plurality of channels for forming on the display screen a magnified erect image for a display image on the display panel through the corresponding first and second lenses, the magnifying optical system forming an image of an image point on each portion of the display panel on the display screen through at least three of the channels.

The present invention also resides in a display device comprising: a display panel having a predetermined effective display region; a display screen having an image display region larger than the effective display region of the display panel; a magnifying optical system arranged between the display panel and the display screen and including a first inverting optical system constituted by a first lens array, in which a plurality of first lenses corresponding to the display panel are arrayed on a main surface of a display panel side and a plurality of second lenses are arrayed on an opposing main surface, and a second inverting optical system constituted by a second lens array, in which a plurality of third lenses corresponding to the first lenses are arrayed on a main surface of a first lens array side and a plurality of fourth lenses are arrayed on an opposing main surface, the magnifying optical system constituting a plurality of channels for forming on the display screen a magnified erect image for a display image on the display panel through the corresponding first and second lenses; and deflecting means for deflecting optical axes of light emitted from the display panel in accordance with a magnification of the magnifying optical system, the first to fourth lenses being arranged along the optical axes deflected by the deflecting means.

Further, the present invention resides in a display device comprising: a display panel having a predetermined effective display region; a display screen having an image display region larger than the effective display region of the display panel; a magnifying imaging optical system arranged between the display panel and the display screen and including a first inverting optical system constituted by a first lens array in which a plurality of first lenses corresponding to the display panel are arrayed and a second inverting optical system in which a plurality of second lenses corresponding to the first lenses are arrayed, the magnifying imaging optical system constituting a plurality of channels for forming on the display screen a magnified erect image for a display image on the display panel through the corresponding first and second lenses; and deflecting means for deflecting optical axes of light emitted from the display panel in accordance with a magnification of the magnifying optical system, the first and second lenses being arranged along the optical axes deflected by the deflecting means.

Further, the present invention resides in a display device comprising: a display panel having a predetermined effective display region; a display screen having an image display region larger than the effective display region of the display panel; and a magnifying optical system arranged between the display panel and the display screen and including a first inverting optical system constituted by a first lens array in which a plurality of first lenses corresponding to the display panel are arrayed and a second inverting optical system constituted by a second lens array in which a plurality of second lenses corresponding to the first lenses are arrayed, the magnifying optical system constituting a plurality of channels for forming on the display screen a magnified erect image for a display image on the display panel through the corresponding first and second lenses, a positional relationship of the first and second lenses being set so that arbitrary points on the display panel superpose each other on the display screen through the plurality of channels.

The present invention will be described in detail based on concrete examples. However, the present invention is not limited to the following concrete examples.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a schematic structural diagram of a liquid crystal display device according to another modification of the embodiment shown in FIG. 1;

FIG. 7 is a schematic structural diagram of a liquid crystal display device according to another embodiment of the present invention;

DETAILED DESCRIPTION OF THE INVENTION

In the following, a liquid crystal display device is indicated as an example of the display device according to an embodiment of the present invention and described in detail with reference to the drawings.

<First Embodiment>

A liquid crystal display device of a first embodiment will be described in detail.

Figure 1:
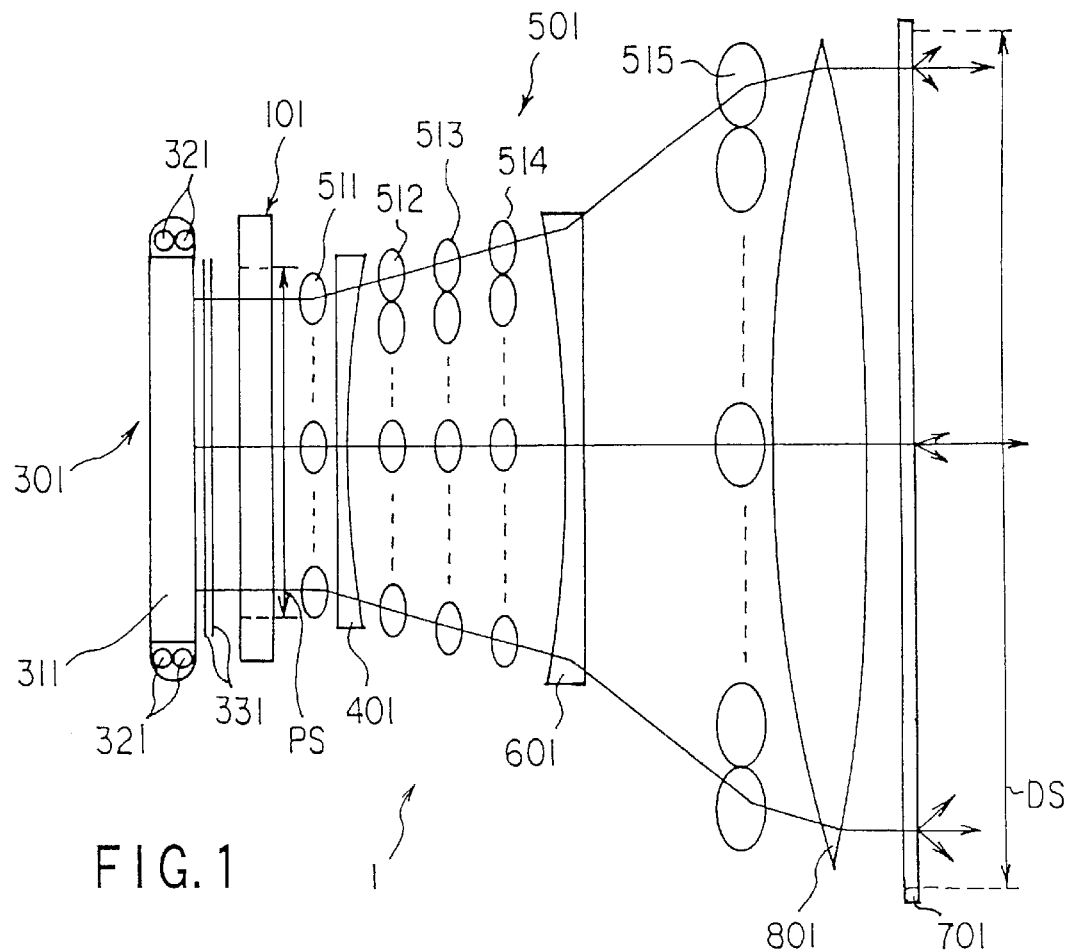
FIG. 1 is a schematic structural diagram of a liquid crystal display device according to an embodiment of the present invention.

As shown in FIG. 1, the liquid crystal display device 1 comprises: a liquid crystal display panel 101; a driving circuit board (not shown) for supplying a driving signal to the liquid crystal display panel 101; a surface light source portion 301 arranged on the rear surface side of the liquid crystal panel 101; light path deflecting means 401 arranged in front of the liquid crystal panel 101; a lens array group 501 including first to fifth lens arrays 511 to 515; a magnifying lens 601; and a display screen 701 arranged in front of the magnifying lens 601.

Figure 2:
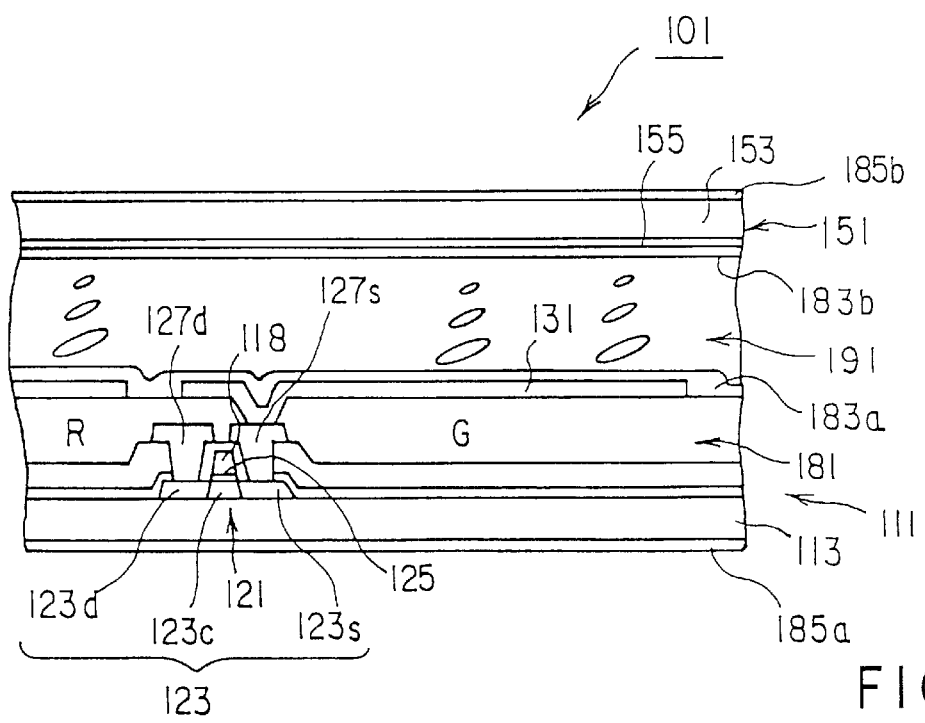
FIG. 2 is a schematic structural diagram of a liquid crystal panel of the liquid crystal display device shown in FIG. 1.

First, the liquid crystal panel 101 includes an effective display region PS of a diagonal size of 12 inches having (1024×3)×768 display pixels. To realize the aforementioned high definition, as shown in FIG. 2, the liquid crystal panel 101 includes an array substrate 111 having a thin film transistor (TFT) 121 which uses polycrystalline silicon (p-Si) thin film in an active layer and serves as a switch element for controlling the respective pixels. The liquid crystal panel 101 also includes a counter substrate 151, and a TN liquid crystal layer 191 held between the array substrate 111 and the counter substrate 151 respectively via alignment films 183a and 183b.

To realize color display, a color filter may be formed on the array substrate 111 or the counter substrate 151. A color image may be displayed by performing divisional drive, in which each field period is divided into the respective color periods. In this embodiment, a color filter 181 is formed on the array substrate 111.

More specifically, the array substrate 111 comprises a transparent insulating substrate 113 made of glass and having a thickness of 0.7 mm. On the transparent insulating substrate formed are 1024×3 signal lines and 768 scanning lines arranged in a matrix (not shown), TFTs 121 each located near the intersection between each signal line and scanning line and serving as a switching element, and pixel electrodes 131 formed of ITO and connected to the TFTs 121.

Each TFT 121 comprises: a polycrystalline silicon (p-Si) film 123 including a channel region 123c and source and drain regions 123d and 123s arranged so as to sandwich the channel region 123c; a gate electrode 118 located above the channel region 123c of the p-Si film 123 via a gate insulating film 125 and electrically connected to a scanning line; and source and drain electrodes 127s and 127d respectively connected to the source and drain regions 123s and 123d. The gate electrode 118 is connected to the scanning line, the drain electrode 127d is connected to the signal line, and the source electrode 127s is connected to the pixel electrode 131.

The pixel electrode 131 is arranged on the color filter layer 181 which is located above the TFT 121 and also serves as an interlayer insulating film.

The counter substrate 151 comprises: a transparent insulating substrate 153 made of glass and having a thickness of 0.5 mm; and a counter electrode 155 made of ITO and formed on the transparent insulating substrate so as to face the pixel electrode 131.

To ensure a sufficient quantity of light, the surface light source portion 301, arranged on the rear surface side of the liquid crystal panel 101 having the above structure, comprises a light guide plate 311 in the form of a thin plate made of acrylic resin and cold-cathode tubes 321 arranged in two lines at each end face of the light guide plate 311 along the longitudinal axis, as shown in FIG. 1. On the surface of the light guide plate 311, prism sheets 331 produced by, for example, 3M Ltd., are arranged in two layers in order to convert diffuse light from the light guide plate 311 to relatively uniform, parallel light. Although not shown, a milky-white dot pattern is printed on the rear surface side of the light guide plate 311 to selectively cause light propagated through the light guide plate 311 to be emitted from the main surface.

Figure 3:
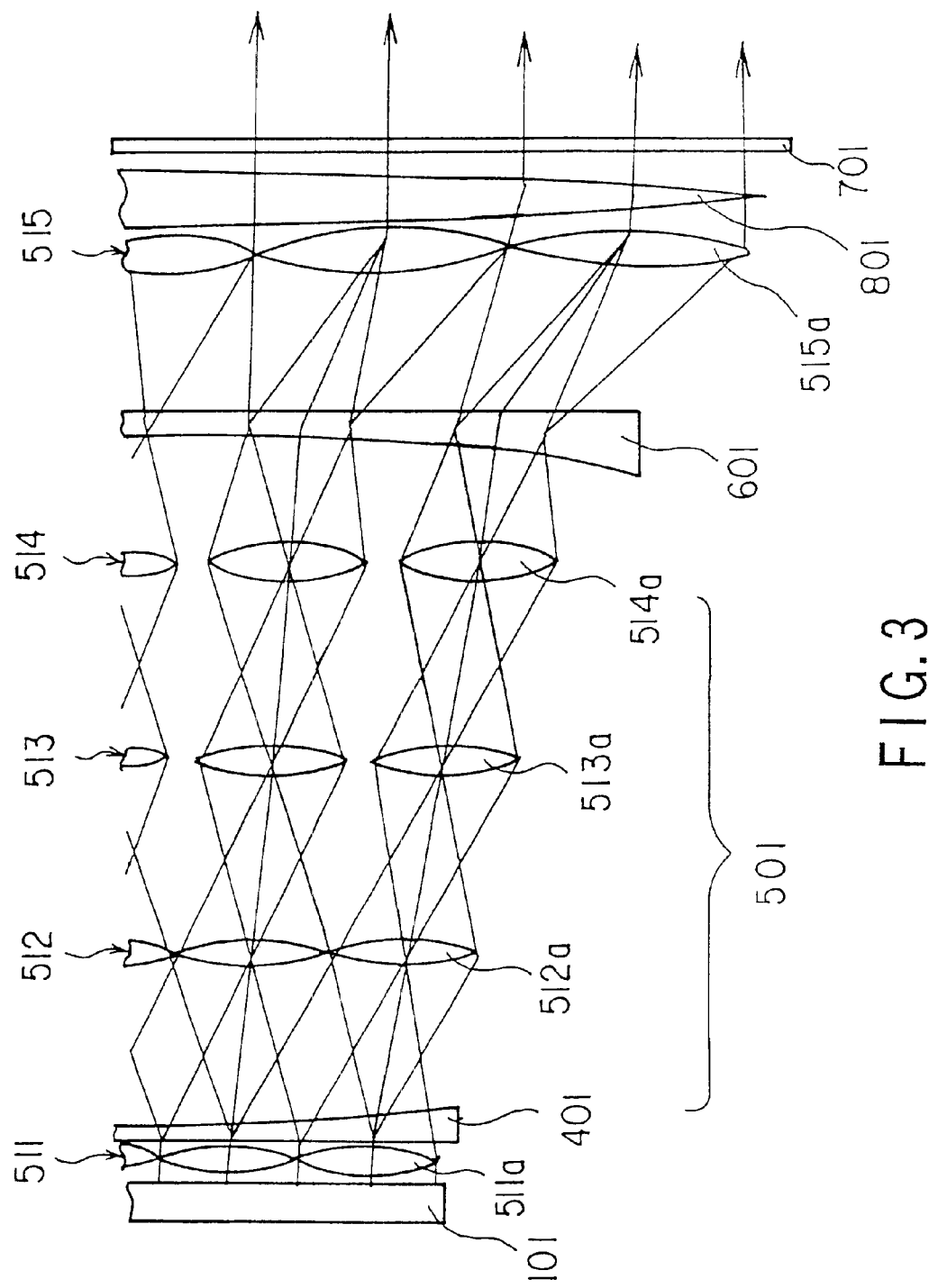
FIG. 3 is a schematic structural diagram of a lens array group of the liquid crystal display device shown in FIG. 1.

Next, an optical system located in front of the liquid crystal panel 101 will be described with reference to FIGS. 1 and 3.

Lenses 511a to 515a of the first to fifth lens arrays 511 to 515 constituting the lens array group 501, arranged in front of the liquid crystal panel 101, respectively correspond to, for example, 24×18 divided regions of the effective display region PS of the liquid crystal panel 101. Although the effective display region PS of the liquid crystal panel 101 is divided into 24×18 regions in this embodiment, it may be divided into regions corresponding to the respective display pixels or display picture elements. The number of divided regions can be determined by the magnification power, the distance between the liquid crystal panel 101 and the display screen 701, etc. In consideration of the display quality or the like, it is preferable that the number of divided regions be nine or more.

First, the lenses 511a of the first lens array 511 of the lens array group 501 guide light from the respective regions to the centers of the lenses of the second lens array 512.

A concave lens, as the light path deflecting means 401, is arranged between the first lens array 511 and the second lens array 512. As a result, the optical axis of light passed through each lens 511a of the first lens array 511 is deflected to the corresponding lens 512a of the second lens array 512. The optical path deflecting means 401 may be a convex lens, a Fresnel lens, a prism or a bundle of optical fibers as needed, besides the concave lens.

Each lens 512a of the second lens array 512 is an image-forming lens for forming an inverted image on the position of the third lens array 513. The corresponding lens 513a of the third lens array 513 concentrates light onto the corresponding lens 514a of the fourth lens array 514. The corresponding lens 514a of the fourth lens array 514 is an image-forming lens for forming an inverted image on the display screen 701. As a result, an erect and magnified image for the image on the liquid crystal panel 101 is formed on the display screen 701.

Each lens 515a of the fifth lens array 515 limits beam divergence of each light passed through the fourth lens array 514 and projects the light onto the display screen 701.

In this embodiment, the lens array group 501 is constructed so as to form an erect image at a magnification of about 1.2 on the display screen 701 depending on the optical design and the setting of the distance between the lens arrays. Further, in this embodiment, a concave lens as the magnifying lens 601 is arranged between the fourth and fifth lens arrays 514 and 515 of the lens array group 501. As a result, an erect image at a magnification of about 1.7 is formed on the display screen 701. The magnifying lens 601 may be a convex lens, a Fresnel lens, a prism or the like as needed, besides the concave lens.

The display screen 701 has an image display region DS of a diagonal size of 20 inches. To ensure a satisfactory viewing angle, it is constituted by a light transmission type screen having a suitable diffusing power.

As described above, according to the liquid crystal display device 1 of this embodiment, a display image displayed in the effective display region PS of the liquid crystal panel 101 having the diagonal size of 12 inches could be magnified and projected on the image display region DS of the diagonal size of 20 inches with a distance of 100 mm.

In addition, according to the liquid crystal display device 1 of this embodiment, the effective display region PS of the liquid crystal panel 101 is divided into a plurality of regions. The divided regions respectively correspond to the lenses 511a to 515a of the first to fifth lens arrays 511 to 515 to guide the image. Therefore, a sufficiently magnified image could be obtained in a short light path without undesired crosstalk.

Therefore, since it is possible to use a panel having a relatively small effective display region PS as the liquid crystal panel 101, an inexpensive device could be obtained.

In this embodiment, a collimator lens 801 serving as light path deflecting means is arranged between the fifth lens array 515 of the lens array group 501 and the display screen 701. The collimator lens makes the optical axis of light passed through each lens of the fifth lens array 515 substantially coincide with the direction of the normal to the display screen 701. As a result, uniformity of brightness of the screen is ensured and a satisfactory display quality is realized. However, the optical axes may be slightly converged in a direction approximately toward the center of the display screen 701. In this case, the quality of display observed by a person at the center can be improved. As the optical path deflecting means, a concave lens, a convex lens, a Fresnel lens, a prism or the like may be used as needed.

Figure 4:
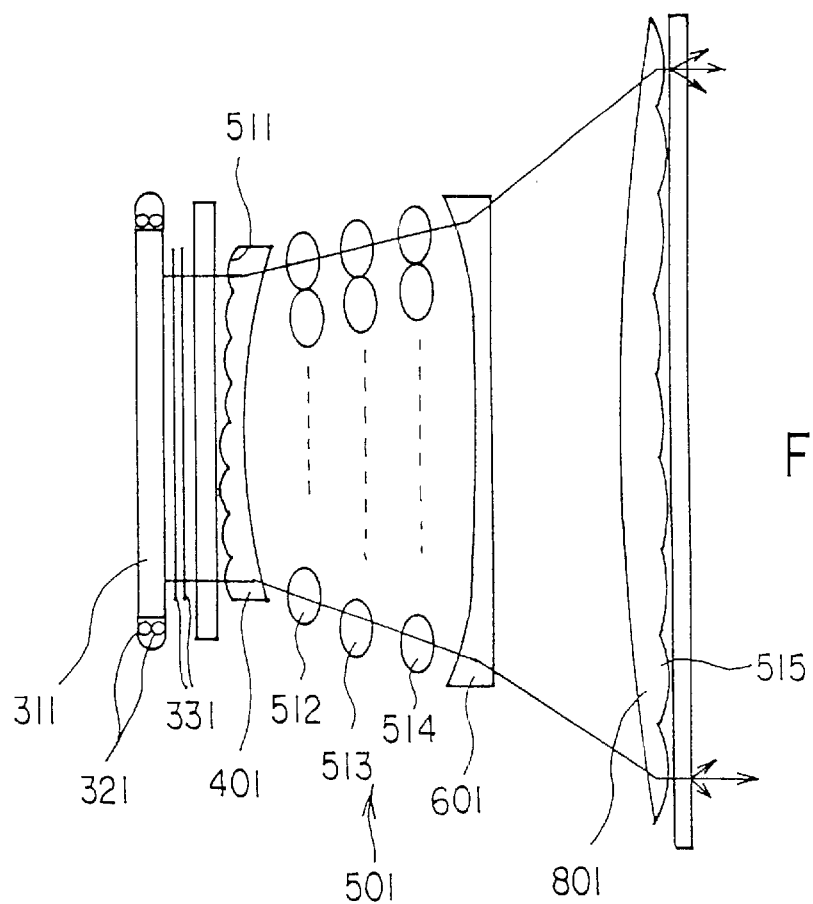
FIG. 4 is a schematic structural diagram of a liquid crystal display device according to a modification of the embodiment shown in FIG. 1.

In the embodiment described above, the first or fifth lens array 511 or 515 effectively functions to reduce the display unevenness, but may be deleted from the structure. Further, for example, as shown in FIG. 4, the first lens array 511 may be formed integral with the light path deflecting means 401. The fifth lens array 515 may be formed integral with the collimator lens 801 and arranged integrally with the rear surface side of the display screen 701. As a result, the number of lenses is reduced and the optical alignment is eased. Consequently, a more inexpensive device can be obtained.

Figure 5:
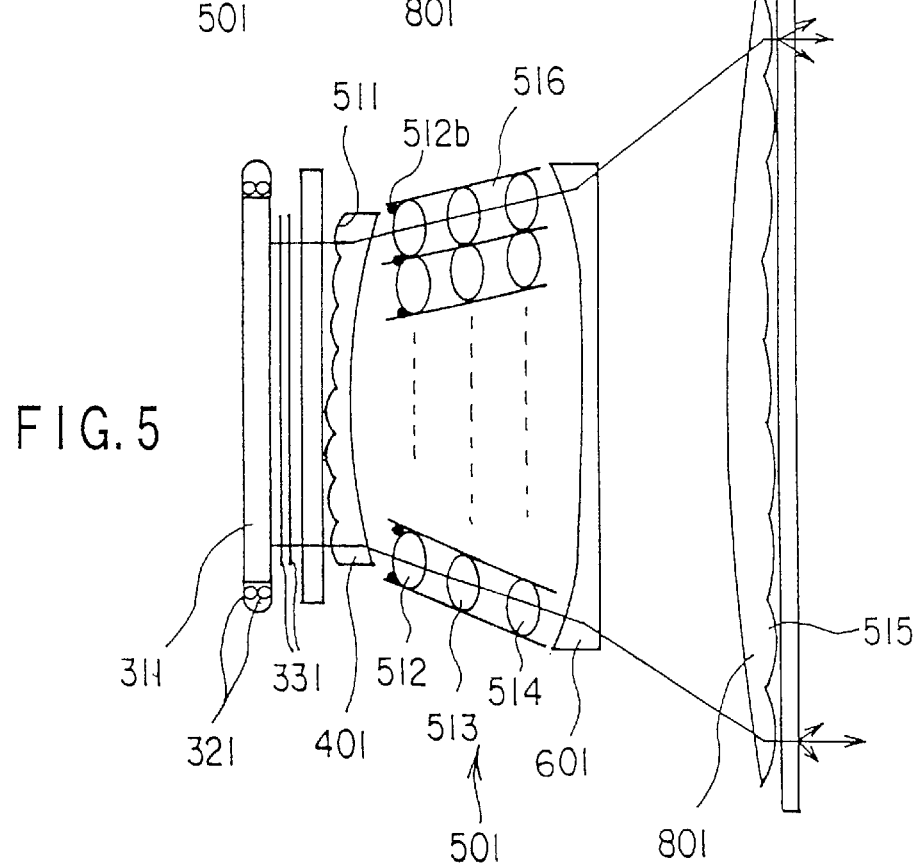
FIG. 5 is a schematic structural diagram of a liquid crystal display device according to another modification of the embodiment shown in FIG. 1.

Further, crosstalk can be much more reduced by arranging a light shielding mask 512b between the lenses 512a of the second lens array 512, as shown in FIG. 5. The light shielding mask 512a can also be arranged between the lenses of another lens array.

Crosstalk can be further reduced by arranging louvers 516 for separating light beams between the lenses of each of the lens arrays 511 to 515.

In this embodiment, the lens array group 501 constituted by the first to fifth lens arrays 511 to 515 is use as an optical system for forming an erect magnified image. However, the lens array group 501 may have a different structure including, for example, an odd number of image-forming lenses, thereby constituting an optical system for forming an inverted magnified image.

Moreover, in the optical system for forming an erect magnified image, for example, the first inverse image-forming may be carried out at a magnification of a small absolute value, i.e., reduction image-forming may be carried out, and then the second inverse image-forming may be carried out at a magnification of a large absolute value, i.e., magnifying image-forming may be carried out. In this case, it is possible to use small-aperture lenses, which contribute to reduction in cost of the apparatus.

Furthermore, as shown in FIG. 6, it is effective to arrange an optical diaphragm 517 between the lens arrays. With this structure, it is possible to prevent undesired light from being incident on adjacent lenses, thereby providing a satisfactory display image without crosstalk. If the diaphragm 517 has a controllable structure variable in accordance with the ambient luminous intensity, a satisfactory display image corresponding to the brightness of the environment can be obtained. For example, if the surrounding environment is fully light, the diaphragm 517 is comparatively opened, thereby increasing the light utilization efficiency, with the result that the display image can be observed satisfactorily. On the other hand, if the surrounding environment is dark, the diaphragm 517 is comparatively narrowed down, thereby realizing a high-contrast image display.

In the embodiment described above, the light path deflecting means 401 is arranged between the first lens array 511 and the second lens array 512. However, the path deflecting means 401 may be arranged between the liquid crystal panel 101 and the first lens array 511. In this case, the liquid crystal panel 101 and the first lens array 511 may be constructed integrally.

In the embodiment described above, a magnified image is formed by the combination of the lens array group 501 and the magnifying lens 601 constituting the magnified-image forming optical system. The magnifying lens 601 may be arranged on the light incident side of the lens array group 501 as well as the light emission side thereof.

A liquid crystal display device 1 according to another embodiment of the present invention will now be described with reference to FIG. 7, in which the same reference numerals denote the same parts as those described above.

The liquid crystal display device 1 has substantially the same structure as that of the first embodiment except that the magnifying lens 601 is removed. The light path deflecting means 401 is molded integral with the first lens array 511 of the lens array group 501. The collimator lens 801 is molded integral with the fifth lens array 515 of the lens array group 501.

With this structure, although the magnification power is lower than that of the above embodiment, the structure of the optical system can be very simple and the size of the device can be compact.

In this case also, a lens diaphragm, a light shielding mask or louvers or the like may be combined in the same manner as in the case of the above embodiment.

In the above description of the embodiments, the light-transmission-type liquid crystal panel is taken as an example. However, the embodiment may be applied to a reflection-type display device or a self-emission-type display device, such as an EL panel.

In the embodiments, the single liquid crystal panel 101 is used. However, needless to say, a large-area display can be allowed by using a plurality of panels adhered to each other.
<Second Embodiment>

The display principle of a display device according to a second embodiment of the present invention will now be described with reference to the drawings.

Figure 8:
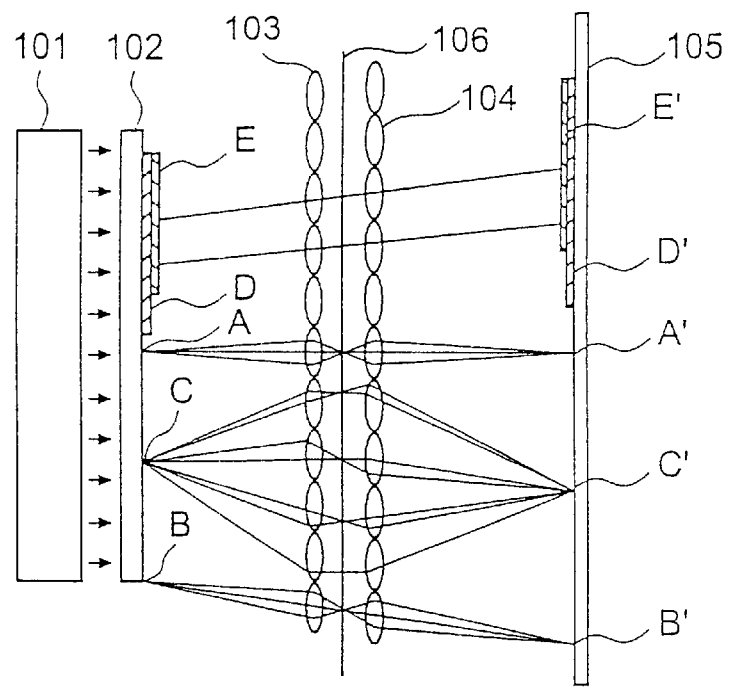
FIG. 8 is a schematic diagram for explaining an operation of a liquid crystal display device according to another embodiment of the present invention.

In FIG. 8, a reference numeral 1101 denotes a backlight device, 1102 a liquid crystal panel of light-transmission type, 1103 a first lens array constituting a first inverting optical system, 1104 a second lens array constituting a second inverting optical system, and 1105 a display screen. The first and second lens arrays 1103 and 1104 function as a magnifying optical system, in which a plurality of channels are formed by the combinations of the lenses.

The light passed through the liquid crystal panel 1102 is image-formed as an inverted image on an image surface 1106 by means of the lenses of the first lens array 1103. Further, an erect magnified image is image-formed on the display screen 1105 by means of the lenses of the second lens array 1104. The focal lengths of the first and second lens arrays 1103 and 1104 are adjusted so as to obtain desired magnification powers, respectively.

As a result, an image point A on the liquid crystal panel 1102 is image-formed at a focal point A' on the display screen 1105, and an image point B is image-formed at a focal point B' on the display screen 1105.

Since each channel of the first and second lens arrays 1103 and 1104 is allotted a sufficient region of the liquid crystal panel 1102, the images allotted to the adjacent channels can be fully superposed.

More specifically, as shown in the drawing, an image point C in the effective region of the liquid crystal panel 1102 is image-formed on a focal point C' on the display screen 1105 via three or more channels. Therefore, for example, regions D and E are image-formed as erect magnified images of regions D' and E', respectively. The regions overlap each other, with the result that a consistent magnified image is formed in the overall screen as a whole.

Thus, since the image points on the liquid crystal panel 1102 are image-formed and projected onto the screen via a number of channels, sufficient display brightness is ensured on the whole.

To prevent undesired crosstalk, i.e., an influence of a channel having an inferior imaging characteristic, it is preferable that light emitted from each portion of the liquid crystal panel 1102 have a high degree of parallelization. More specifically, the angle between the light emitted from each portion of the liquid crystal panel 1102 and the direction of transmission of the main light determined by the half-width of brightness is preferably 300 or smaller, particularly preferably 200 or smaller, although it may vary depending on the lens design.

Further, it is preferable that the ratio of the lens pitch of the first lens array 1103 to the lens pitch of the second lens array be set such that the amount of relative shift of image-forming positions in adjacent channels can coincide with the magnification power of each channel. This matter will be described, with reference to FIG. 9.

It is assumed that the distance to the focal point of each lens of the first lens array 1103 is $f_1$ and the distance to the focal point of each lens of the second lens array 1104 is $f_2$. It is also assumed that the lens pitch of the first lens array 1103 is $P_1$ and the lens pitch of the second lens array 1104 is $P_2$. Further, as shown in the drawing, it is assumed that the distance between the liquid crystal panel 1102 and the first lens array 1103 is $a_1$, the distance between the first lens array 1103 and the image surface 1106 is $b_1$, the distance between the image surface 1106 and the second lens array 1104 is $b_2$ and the distance between the second lens array 1104 and the display screen 11105 is $a_2$.

At this time, since the image surfaces have a image formation relationship, the following equations are established:

$$(1/a_1)+(1/b_1)=(1/f_2),$$

$$(1/a_2)+(1/b_2)=(1/f_2)$$

The imaging magnification η is obtained by the following equation:

$$\eta = (b_1/a_1)(a_2/b_2)$$
$$= (a_2/b_1)(a_1/b_2)$$

The optical axis of each channel (in this embodiment, the straight line passing through the centers of two lenses of the lens arrays 1103 and 1104 constituting each channel) per se corresponds to the path of a light beam. Therefore, the points where the light beam crosses the liquid crystal panel 1102 and the display screen 1105 are corresponding points.

Figure 9:
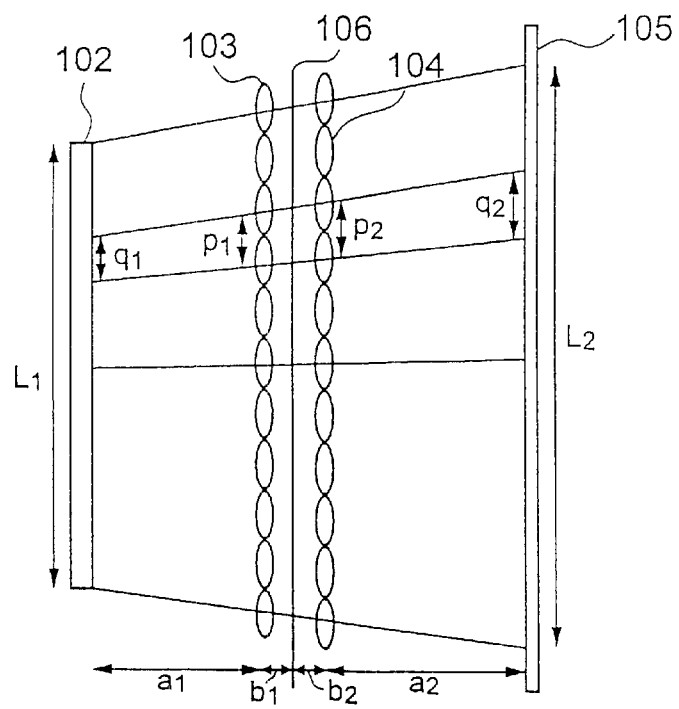
FIG. 9 is a schematic diagram for explaining an operation of a liquid crystal display device according to another embodiment of the present invention.

As shown in FIG. 9, assuming that the distance between corresponding points on the liquid crystal panel 1102 is $q_1$ and the distance between corresponding points of the diffusion screen 1105 is $q_2$, these values are obtained by the following equations:

$$q_1 = p_1 - (p_2 - p_1)a_1/(b_1 + b_2)$$
$$q_2 = p_2 + (p_2 - p_1)a_2/(b_1 + b_2)$$

Thus, it is necessary that the imaging magnification be equal to the ratio of the distances of the corresponding points ($p_2/p_1$). For this purpose, it is required that the following condition be satisfied:

$$(a_2 b_1)/(a_1 b_2) = \{p_2 + (p_2 - p_1)a_2/(b_1 + b_2)\}/$$
$$\{p_1 - (p_2 - p_1)a_1/(b_1 + b_2)\}$$

The above equation is rewritten as follows:

$$(p_2/p_1) = \{1 + \eta(b_1/a_2)\}/\{1 + \eta(b_2/a_1)\}$$

Assuming that the magnification of the first inverted image forming optical system is $\eta_1(=-b_1/a_1)$ and the magnification of the second inverted image forming optical system is $\eta_2(=-a_2/b_2)$, the following equation is obtained:

$$(p_2/p_1) = \{1 - \eta_1\}/\{1 - (1/\eta_2)\}$$

It is important to set the lens pitches of the lenses of the first lens array 1103 and the lenses of the second lens array 1104, constituting the channels, so as to satisfy the above relationship. As a result, a magnified image of a satisfactory display quality can be obtained. Since both ($b_1/a_1$) and ($b_2/a_2$) are numbers much smaller than 1, the difference between the pitches is very small. However, it is desired that the difference in pitch be controlled accurately.

A field lens or an additional image forming lens may be arranged between the first lens array 1103 and the second lens array 1104. If a lens array is arranged, it is preferable that the lens pitch be adjusted in the same manner as described above.

A display device according to a first concrete example of this embodiment will be described in detail with reference to the drawings.

Figure 10:
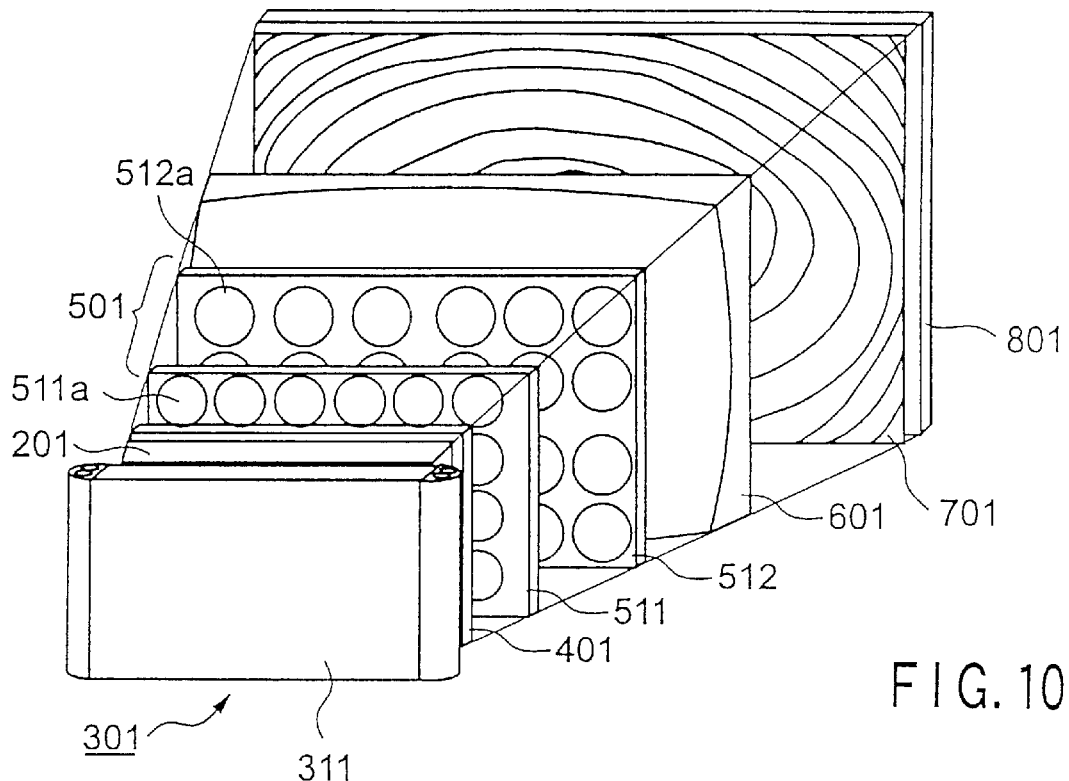
FIG. 10 is a schematic perspective view of a liquid crystal display device according to a concrete example of another embodiment of the present invention.
Figure 11:
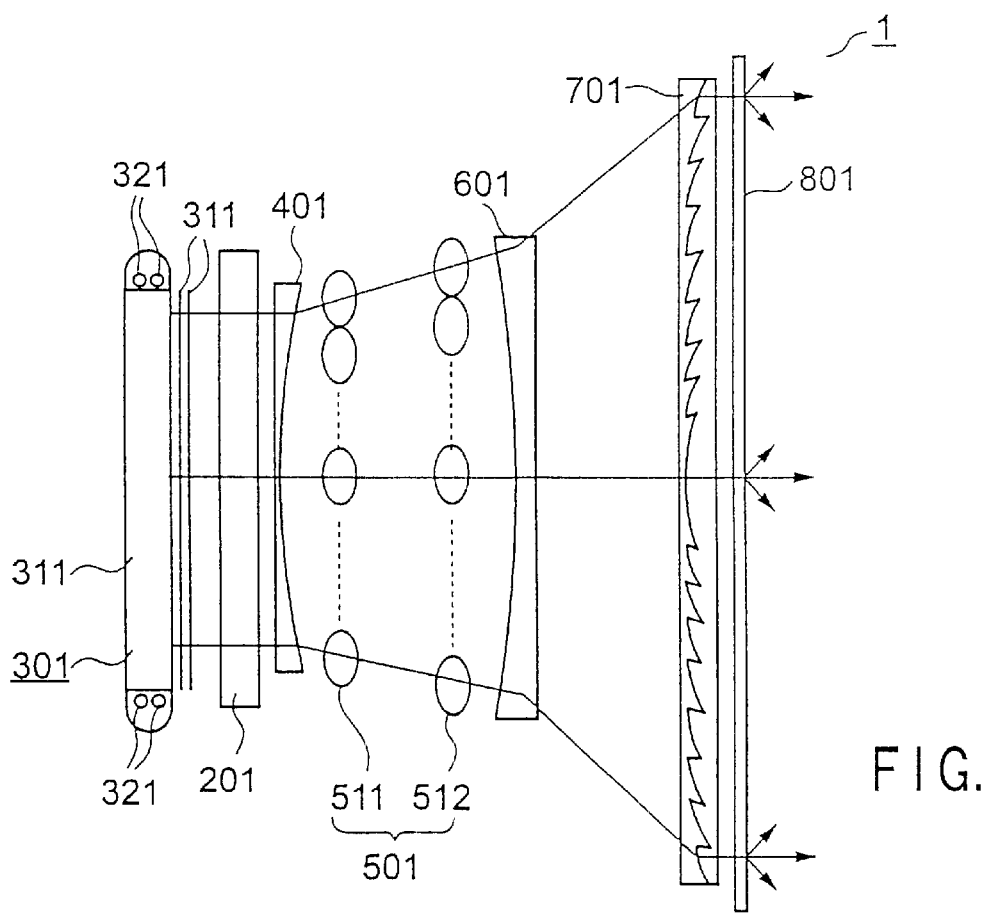
FIG. 11 is a schematic structural diagram of a liquid crystal display device according to a modification of the embodiment shown in FIG. 10.

As shown in FIGS. 10 and 11, a liquid crystal display device 1000 comprises: a liquid crystal display panel 1201; a driving circuit board (not shown) for supplying a driving signal to the liquid crystal display panel 1201; a surface light source portion 1301 arranged on the rear surface side of the liquid crystal panel 1201; first light path deflecting means 1401 arranged in front of the liquid crystal panel 1201; a lens array group 1501 including first and second lens arrays 1511 and 1512; a magnifying lens 1601; second light path deflecting means 1701 arranged in front of the magnifying lens 1601; and a display screen 1801.

A plurality of channels are constituted by the corresponding lenses of the first and second lens arrays 1511 and 1512.

The liquid crystal panel 1201 includes an effective display region PS of a diagonal size of 12 inches having (1024×3)×768 display pixels. Since the structure thereof is the same as the above-described structure (see FIG. 9), the description thereof is omitted.

To ensure a sufficient quantity of light, the surface light source portion 1301, arranged on the rear surface side of the liquid crystal panel 1201 having the above structure, comprises a light guide plate 1311 in the form of a thin plate made of acrylic resin and cold-cathode tubes 1321 arranged in two lines at each end face of the light guide plate 1311 along the longitudinal axis, as shown in FIGS. 10 and 11. On the surface of the light guide plate 1311, prism sheets 1331 produced by, for example, 3M Ltd., are arranged in two layers in order to convert diffuse light from the light guide plate 1311 to relatively uniform, parallel light. With this structure, the angle between the light emitted from each portion of the liquid crystal panel 1201 and the direction of transmission of the main light determined by the half-width of brightness is controlled to about 25°.

Although not shown, a milky-white dot pattern is printed on the rear surface side of the light guide plate 1311 to selectively cause light propagated through the light guide plate 1311 to be emitted from the main surface. In this concrete example, to make the display brightness uniform, the dot pattern is formed such that comparatively high brightness is obtained in a peripheral region of the light guide plate 1311. This is because there are less number of channels in a peripheral region of the display screen 1801 as compared to a central region, and therefore reduction in brightness cannot be avoided. To compensate for this, the distribution of the brightness of the surface light source portion 1301 is adjusted.

Next, an optical system arranged in front of the liquid crystal panel 1201 will be described.

The first and second lens arrays 1511 and 1512 constituting the lens array group 1501, arranged in front of the liquid crystal panel 1201, constitute inverted image forming optical systems. They respectively include 24×18 lenses 1511a and 1512a corresponding to the effective display region PS of the liquid crystal panel 1201 and constitute 24×18 channels. The number of channels can be determined by the magnification power, the distance between the liquid crystal panel 1201 and the display screen 1801, etc. In consideration of the display quality or the like, it is preferable that the number of channels be nine or more.

A concave lens, as the light path deflecting means 1401, is arranged in front of the liquid crystal panel 1201. As a result, the optical axis of light is deflected along the optical axis of each channel. More specifically, the optical axis of light emitted from a peripheral portion of the effective display region PS of the liquid crystal panel 1201 is deflected outward so as to substantially coincide with the optical axis of the corresponding channel. The surface light source portion 1301 is constructed such that the angle between the light emitted from each portion of the liquid crystal panel 1201 and the direction of transmission of the main light determined by the half-width of brightness is sufficiently small. Therefore, the light beam is deflected to the predetermined direction by the optical path deflecting means 1401. This improves the light utilization efficiency and prevents light from being incident on such wide channels as to degrade the image-forming characteristic or stray light into another channel. The optical path deflecting means 1401 may be a Fresnel lens, a prism or a bundle of optical fibers as needed, besides the concave lens.

The lenses 1511a of the first lens array 1511 have a structure in which a focal length $a_1$ on the side of the liquid crystal panel 1201 is 60 mm, a focal length $b_1$ on the side of the display screen 1801 is 4 mm, a lens diameter $D_1$ is 2 mm, and a lens pitch $p_1$ is 2.1 mm.

The lenses 1512a of the second lens array 1512 have a structure in which a focal length $b_2$ on the side of the liquid crystal panel 201 is 4 mm, a focal length $a_2$ on the side of the display screen 1801 is 72 mm, a lens diameter $D_2$ is 2 mm, and a lens pitch $p_2$ is 2.122 mm.

Each lens 1511a of the first lens array 1511 is an image-forming lens for forming an inverted image on the image surface between itself and the lens 1512a of the second lens array 1512. The corresponding lens 1512a of the second lens array 1512 is a lens for forming on the display screen 1801 an erect magnified image for an image of the inverted image formed on the image surface.

The ratio of the lens pitch of the first lens array 1511 to that of the second lens array 1512 is set to satisfy by the following condition, and the lenses 1511a and 1521a are arranged such that the centers of the lenses at the center of the screen coincide with each other:

$$(p_2/p_1) = \{1 + \eta(b_2/a_2)\}/\{1 + \eta(b_2/a_2)\}$$

In this concrete example, the lens array group 1501 is constructed so as to form an erect image at a magnification of about 1.2 on the display screen 1801 depending on the optical design and the setting of the distance between the lens arrays.

Further, in this concrete example, a concave lens as the magnifying lens 1601 is arranged in the stage subsequent to the lens array group 1501. As a result, an erect image at a magnification of about 1.7 is formed on the display screen 1801.

The display screen 1801 has an image display region DS of a diagonal size of 20 inches. To ensure a satisfactory viewing angle, it is constituted by a light transmission type screen having a suitable diffusing power.

As described above, according to the liquid crystal display device 1 of this embodiment, a display image displayed in the effective display region PS of the liquid crystal panel 1101 having the diagonal size of 12 inches could be magnified and projected on the image display region DS of the diagonal size of 20 inches with a distance of 170 mm.

In addition, according to the liquid crystal display device 1 of this concrete example, satisfactory display brightness could be ensured by magnifying and projecting an image point on the liquid crystal panel 1201 through a plurality of channels constituted by the corresponding lenses 1511a and 1512a of the first and second lens arrays 1511 and 1512.

Further, the lens pitches of the first and second lens arrays 1511 and 1512 have such a relationship as to keep the positional accuracy which may not cause undesirable discontinuity of superposition of images constituted by the channels. Therefore, the display image is prevented from degradation. Further, the light emitted from the liquid crystal panel 1201 is controlled to a sufficient degree of parallelization, as described above, owing to the device of the structure of the surface light source portion 1301. Therefore, degradation of the image quality, due to crosstalk from a channel having an inferior image forming characteristic, is fully overcome.

Moreover, brightness of the light source light from the surface light source portion 1301 is higher in a peripheral region of the liquid crystal panel 1201 than in a central region to compensate for lack of the amount of light in a peripheral region of the display screen 1801. Therefore, the variation in display brightness on the screen is fully overcome.

In this concrete example, a Fresnel lens as the second light path deflecting means 1701 is arranged between the lens array group 1501 and the display screen 1801. This arrangement makes the optical axis of light incident on the display screen 1801 substantially coincide with the direction of the normal to the display screen 1801. As a result, uniformity of brightness of the screen is ensured and a satisfactory display quality is realized. However, the optical axes may be slightly converged in a direction approximately toward the center of the display screen 1801. In this case, the quality of display observed by a person at the center can be improved.

In the liquid crystal display device 1 of this concrete example, the first lens array 1511 and the first light path deflecting means 1401 may be formed integrally, or the second lens array 1512 and the magnifying lens 1601 may be formed integrally. Further, the second light path deflecting means 1701 may be arranged integrally with the rear surface side of the display screen 1801. As a result, the number of lenses is reduced and the optical alignment is eased. Consequently, a more inexpensive device can be obtained.

In this concrete example, the magnifying lens 1601 is arranged between the lens array group 1501 and the display screen 1801. However, a magnifying lens can be arranged between the liquid crystal panel 1201 and the magnifying lens 1601. It is also possible to combine them.

A display device according to a second concrete example of this embodiment will be described in detail with reference to the drawings.

Figure 12:
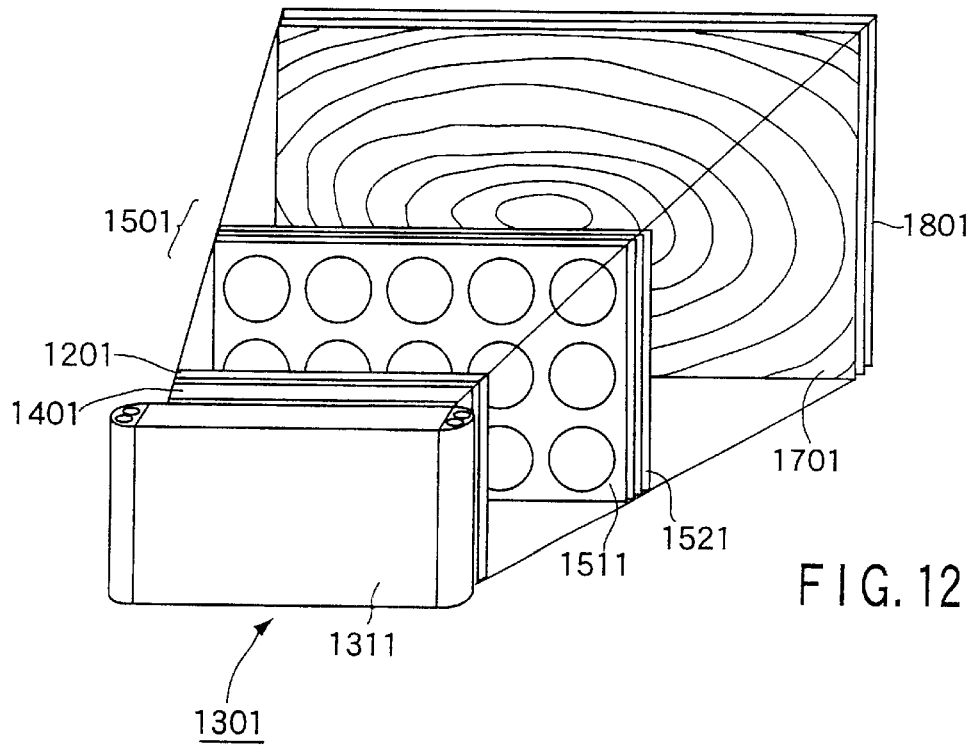
FIG. 12 is a schematic perspective view of a liquid crystal display device according to a concrete example of another embodiment of the present invention.
Figure 14:
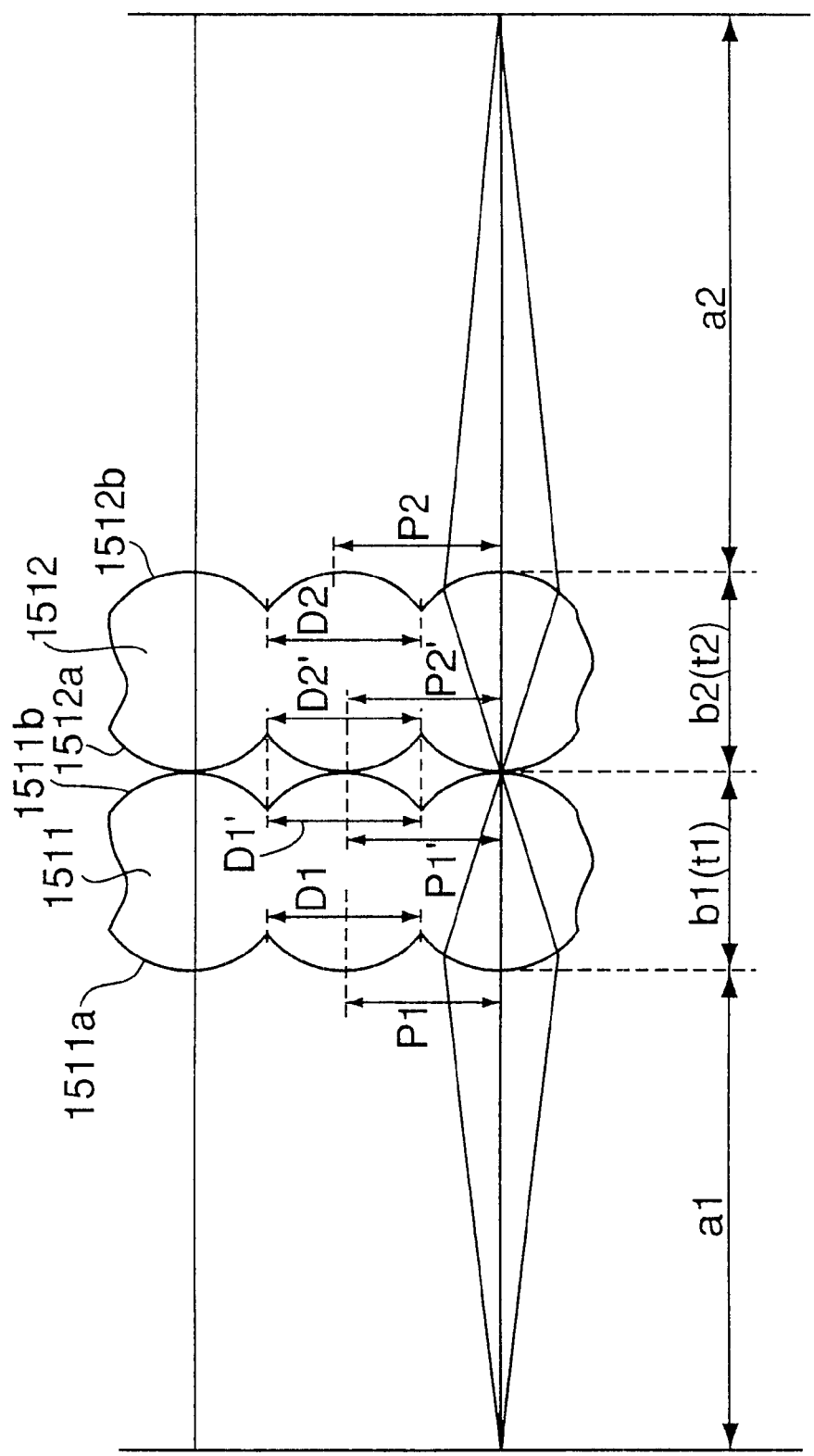
FIG. 14 is a schematic cross-sectional view showing a part of the liquid crystal display device shown in FIG. 13.

As shown in FIGS. 12 and 14, a liquid crystal display device 1000 comprises: a liquid crystal display panel 1201; a driving circuit board (not shown) for supplying a driving signal to the liquid crystal display panel 1201; a surface light source portion 1301 arranged on the rear surface side of the liquid crystal display panel 1201; first light path deflecting means 1401 arranged between the liquid crystal display panel 1201 and the surface light source portion 1301; a lens array group 1501 including first and second lens arrays 1511 and 1512; second light path deflecting means 1701; and a display screen 1801.

A plurality of channels are constituted by the corresponding lenses of the first and second lens arrays 1511 and 1512.

The liquid crystal panel 1201 includes an effective display region PS of a diagonal size of 10.5 inches having (1024× 3)×768 display pixels. The structure of the liquid crystal panel 201 is substantially the same as that of the concrete example described above except for the difference in size and that a ferroelectric liquid crystal layer is held in place of the TN liquid crystal layer 191.

In this concrete example, to prevent image deterioration after passing through the liquid crystal panel 1201, the liquid crystal panel 1201 is arranged in a stage subsequent to the first light path deflecting means 1401. For this reason, the angles of incidence of light input to the liquid crystal panel 1201 are greatly different in central and peripheral portions. Therefore, the display conditions are different in the central and peripheral portions of the liquid crystal panel 1201 which uses the TN liquid crystal layer 1191. However, in this example, since the liquid crystal panel 1201 uses the ferroelectric liquid crystal layer, that is, display is carried out by means of in-plane switching of liquid crystal molecules, the displayed image is not easily influenced by the angle of view. Besides the ferroelectric liquid crystal layer, various layers for performing display by means of in-plane switching can be used, e.g., an antiferroelectric liquid crystal layer may be used. Further, a liquid crystal panel using the IPS (In-Plane-Switching) mode can be used suitably.

Figure 13:
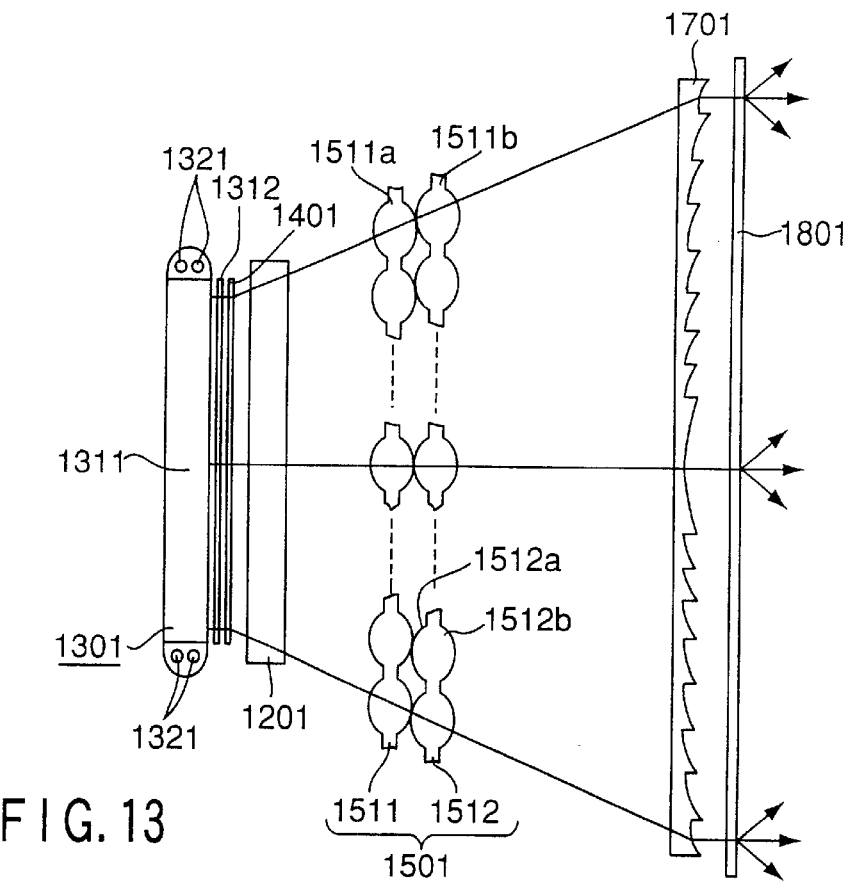
FIG. 13 is a schematic structural diagram of a liquid crystal display device according to a modification of the embodiment shown in FIG. 12.

To ensure a sufficient quantity of light, the surface light source portion 1301, arranged on the rear surface side of the liquid crystal panel 1201 having the above structure, comprises a light guide plate 1311 in the form of a thin plate made of acrylic resin and cold-cathode tubes 1321 arranged in two lines at each end face of the light guide plate 1311 along the longitudinal axis, as shown in FIGS. 12 and 13. On the surface of the light guide plate 1311, a beam condensing sheet 1332 produced by, for example, Allied Signal Corporation, are arranged in order to convert diffuse light from the light guide plate 1311 to relatively uniform, parallel light. Although not shown, the beam condensing sheet 312 comprises a light control section arranged on the light guide plate 1311 in a form of an inverted prismoid and a collimator lens section arranged thereon, which are integrally layered.

With this structure, the angle between the light emitted from each portion of the liquid crystal panel 1201 and the direction of transmission of the main light determined by the half-width of brightness is controlled to about 10°.

Although not shown, a milky-white dot pattern is printed on the rear surface side of the light guide plate 1311 to selectively cause light propagated through the light guide plate 1311 to be emitted from the main surface. In this concrete example also, to make the display brightness uniform, the dot pattern is formed such that comparatively high brightness is obtained in a peripheral region of the light guide plate 1311. This is because there are less number of channels in a peripheral region of the display screen 1801 as compared to a central region, and therefore reduction in brightness cannot be avoided. To compensate for this, the distribution of the brightness of the surface light source portion 1301 is adjusted.

An optical system of the display device of this example will now be described.

The first and second lens arrays 1511 and 1512 constituting the lens array group 1501, arranged in front of the liquid crystal panel 1201, constitute inverted image forming optical systems as in the case of the above example. The number of each of the lenses 1511a, 1511b, 1521a and 1521b is 48×36 corresponding to the effective display region PS of the liquid crystal panel 1201, and these lenses constitute 48×36 channels. The number of channels can be determined by the magnification power, the distance between the liquid crystal panel 1201 and the display screen 1801, etc. In consideration of the display quality or the like, it is also preferable that the number of channels be nine or more.

For example, a concave lens as the light path deflecting means 1401 is arranged between the surface light source portion 1301 and the liquid crystal panel 1201. As a result, the optical axis of the light is deflected along the optical axis of each channel. In other words, the optical axis of light toward a peripheral portion of the effective display region PS of the liquid crystal panel 1201 is directed outward and caused to substantially coincide with the optical axis of the corresponding channel.

As a result, the light utilization efficiency is improved and light is prevented from being incident on such wide channels as to degrade the image-forming characteristic. The optical path deflecting means 1401 may be a Fresnel lens, a prism or a bundle of optical fibers as needed, besides the concave lens.

The first lens array 1511 includes first lenses 511a on the side of the liquid crystal panel 1201 and second lenses 1511b opposite thereto and has a lens thickness $t_1$: 2 mm. More specifically, the first lenses 1511a of the first lens array 1511 have a structure in which a focal length $a_1$ on the side of the liquid crystal panel 1201 is 55 mm, a focal length $b_1$ on the side of the display screen 1801 is 2 mm (the same as the lens thickness), a lens diameter $D_1$ is 1.0 mm, and a lens pitch $p_1$ is 1.1 mm. The second lenses 1511b of the first lens array 1511, having the same optical characteristics as those of the lenses 1511a, are arranged at focal points of the respective lenses 1511a. A lens diameter $D_1'$ is 1.0 mm and a lens pitch $p_1'$ is 1.106097561 mm. The lenses 1511a and 1511b are arranged such that the centers of the lenses at the center of the screen coincide with each other. The viewing angles of the lenses 1511a and 1511b are ±28°.

The second lens array 1512 includes first lenses 1512a on the side of the liquid crystal panel 1201 and second lenses 1512b opposite thereto and has a lens thickness $t_2$: 2 mm. More specifically, the first lenses 1512a of the second lens array 1512 are arranged at the same pitch as the first lenses 1511b of the first lens array 1511, and the apexes of the lenses 1511b and 1512a are in contact with each other. The lenses 1512a of the second lens array 1512 have a structure in which a focal length $a_2$ on the side of the liquid crystal panel 1201 is 2 mm (the same as the lens thickness), a focal length $b_2$ on the side of the display screen 1801 is 80 mm, a lens diameter $D_2$ is 1.0 mm, and a lens pitch $p_1$ is 1.1112195122 mm. The lenses 1511a and 1511b are arranged such that the centers of the lenses at the center of the screen coincide with each other. The viewing angles of the lenses 1511a and 1511b are ±28°.

Each lens 1511a of the first lens array 1511 is an image-forming lens for image-forming an inverted image on the image surface between the lens 1511a and the lens 1512a. The corresponding lens 1512a of the second lens array 1512 is a lens for magnifying and image-forming an erect image on the display screen 1801 from the inverted image formed on the image surface.

The ratio of the lens pitch of the lenses 1511a of the first lens array 1511 to that of the lenses 1512b of the second lens array 1512 is set to satisfy the following equation:

$$(p_2/p_1) = \{1 + \eta(b_2/a_2)\}/\{1 + \eta(b_2/a_2)\}$$

The lens pitches of the lenses 1511b of the first lens array 1511 and the lenses 1512a of the second lens array 1512, which do not contribute to image-forming, are set equal to each other, since the lenses are in contact with each other in this embodiment. The lens pitches satisfy the following relationships:

$$p_1'/p_1 = \{\eta(a_1 + t_1) + (a_1 + t_1)\}/\{\eta a_1 + a_1 + 2t_1)\}$$
$$p_2/p_2' = \{\eta(a_2 + 2t_2) + a_2\}/\{\eta(a_2 + t_2) + (a_2 + t_2)\}$$

In the above equations, it is assumed that the index of refraction of lens material is 1 in order to represent the relationships which do not depend on the index of refraction of the lens material. However, an actual lens is made of a material having an index of refraction of about 1.4 to 1.6. If the lens is made of a material having an index of refraction greater than 1, the lens thickness $t_1$ and $t_2$ in the above equations represent virtual thickness. Actually, it is necessary that the lens arrays have thickness of n×$t_1$ and n×$t_2$, where the index of refraction is n. Naturally, the total length should correspond to the thickness.

Therefore, it is desirable to set a lens pitch suitable for the imaging magnification of each channel in consideration of the index of refraction based on the above equations, so that display images produced in the respective channels can be correctly superposed on one another on the display screen, thereby constituting a magnifying display device.

In this concrete example, the lens array group 1501 is constructed to form a magnified erect image at a magnification of about 1.45 on the display screen 1801.

Accordingly, the display screen 1801 is constituted by a light-transmission type screen having an image display region DS of a diagonal size of 15 inches and a suitable diffusing power to ensure a satisfactory viewing angle.

As described above, according to the liquid crystal display device 1000 of this concrete example, a display image displayed in the effective display region PS of the liquid crystal panel 1101 having the diagonal size of 10.5 inches could be magnified and projected by a less number of optical parts on the image display region DS of the diagonal size of 15 inches with a distance of 150 mm.

In addition, according to the liquid crystal display device 1000 of this concrete example, satisfactory display brightness could be ensured by magnifying and projecting the image points on the liquid crystal panel 1201 through a plurality of channels constituted by the corresponding lenses 1511a and 1512a of the first and second lens arrays 1511 and 1512.

Further, the lens pitches of the first and second lens arrays 1511 and 1512 have such a relationship as to keep the positional accuracy which may not cause undesirable discontinuity of superposition of images constituted by the channels. Therefore, the display image is prevented from degradation. Further, the light emitted from the liquid crystal panel 1201 is controlled to a sufficient degree of parallelization as described above, owing to the device of the structure of the surface light source portion 1301. Therefore, degradation of the image quality, due to crosstalk from a channel having an inferior image forming characteristic, is fully overcome.

Moreover, brightness of the light source light from the surface light source portion 1301 is set higher in a peripheral region of the liquid crystal panel 1201 than in a central region to compensate for lack of the amount of light in a peripheral region of the display screen 1801. Therefore, the variation in display brightness on the screen is fully overcome.

In this concrete example, a Fresnel lens as the second light path deflecting means 1701 is arranged between the lens array group 1501 and the display screen 1801. This arrangement makes the optical axis of light incident on the display screen 1801 substantially coincide with the direction of the normal to the display screen 1801. As a result, uniformity of brightness of the screen is ensured and a satisfactory display quality is realized. However, the optical axes may be slightly converged in a direction approximately toward the center of the display screen 1801. In this case, the quality of display observed by a person at the center can be improved.

In the liquid crystal display device of this concrete example, a magnifying lens may be arranged between the lens array group 1501 and the display screen 1801 as in the first embodiment, or between the liquid crystal panel 1201 and the lens array group 1501. It is also possible to combine them.

Further, in the display device of this concrete example, since the second lenses 1511b of the first lens array 1511 and the first lenses 1512a of the second lens array 1512 are constructed so as to contact each other, the lens pitches thereof could be equal. As a result, the design, the positioning of the optical system, etc. became easier.

However, it is possible to arrange the second lenses 1511b of the first lens array 1511 and the first lenses 1512a of the second lens array 1512 separately from each other. In this case, it is necessary that the lens pitches of the lens arrays be slightly different as described above.

The lens diameter of the second lenses 1511b of the first lens array 1511 or the first lenses 1512a of the second lens array 1512 can be set to a relatively large value. However, since the lens thickness is also increased in this case, it is necessary to set the difference between the pitches of the respective lenses to a large value. For this reason, it may be difficult to maintain the process accuracy and obtain a uniform image quality all over the screen. Therefore, it is preferable that the lens diameter be about 0.5 mm to 2 mm, although it may vary depending on the index of refraction of the lens material.

In the above description of the concrete examples, the light-transmission-type liquid crystal panel is taken as a concrete example. However, the example may be applied to a reflection-type display device or a self-emission-type display device, such as an EL panel.

In the concrete examples, the single liquid crystal panel 1201 is used. However, needless to say, a larger-area display can be allowed by using a plurality of panels adhered to each other.

As has been described above, with the display device of the present invention, a sufficiently magnified image can be realized and high display brightness can be obtained by a compact device. As a result, a direct-view-type display device having a large display area can be obtained at a low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device comprising:

a display panel having a predetermined effective display region;

a display screen having an image display region larger than the effective display region of the display panel; and a magnifying optical system arranged between the display panel and the display screen and including a first inverting optical system constituted by a first lens array in which a plurality of first lenses corresponding to the display panel are arrayed and a second inverting optical system constituted by a second lens array in which a plurality of second lenses corresponding to the first lenses are arrayed, the magnifying optical system constituting a plurality of channels for forming on the display screen a magnified erect image for a display image on the display panel through the corresponding first and second lenses, the magnifying optical system forming an image of an image point on each portion of the display panel on the display screen through at least three of the channels.

2. A display device according to claim 1, wherein the following equation is substantially satisfied:

$$(p_2/p_1) = \{1 + \eta(b_2/a_2)\}/\{1 + \eta(b_2/a_2)\}$$

where $p_1$ and $\eta_1$ respectively denote a lens pitch and a magnification of the first lenses, and $p_2$ and $\eta_2$ respectively denote a lens pitch and a magnification of the second lenses.

3. A display device according to claim 1, wherein light emitted from the display panel has directivity toward the first lens array.

4. A display device according to claim 2, wherein the display panel is a light-transmission type, and a light source device is arranged on a side of the display panel facing the display screen.

5. A display device according to claim 4, wherein the light source device includes a diffusion light source portion and parallilizing means for parallilizing light from the diffusion light source portion.

6. A display device according to claim 1, further comprising light path deflecting means, arranged between the display panel and the magnifying optical system, for deflecting optical axes of light from the display panel along optical axes of the respective channels.

7. A display device according to claim 1, wherein a magnifying lens is arranged between the magnifying optical system and the display screen.

8. A display device according to claim 1, wherein a magnifying lens is arranged between the display panel and the magnifying optical system.

9. A display device according to claim 1, further comprising light path deflecting means, arranged between the magnifying optical system and the display screen, for deflecting optical axes of light from the display panel so as to form a predetermined angle with a main surface of the display screen.

10. A display device according to claim 1, wherein brightness of light emitted from the display panel is set higher in a peripheral portion of the effective display region than in a central portion thereof.

11. A display device comprising:
a display panel having a predetermined effective display region;
a display screen having an image display region larger than the effective display region of the display panel;
a magnifying optical system arranged between the display panel and the display screen and including a first inverting optical system constituted by a first lens array, in which a plurality of first lenses corresponding to the display panel are arrayed on a main surface of a display panel side and a plurality of second lenses are arrayed on an opposing main surface, and a second inverting optical system constituted by a second lens array, in which a plurality of third lenses corresponding to the first lenses are arrayed on a main surface of a first lens array side and a plurality of fourth lenses are arrayed on an opposing main surface, the magnifying optical system constituting a plurality of channels for forming on the display screen a magnified erect image for a display image on the display panel through the corresponding first and second lenses; and
deflecting means for deflecting optical axes of light emitted from the display panel in accordance with a magnification of the magnifying optical system,
the first to fourth lenses being arranged along the optical axes deflected by the deflecting means.

12. A display device according to claim 11, wherein the second lenses and the third lenses contact to each other.

13. A display device according to claim 12, wherein lens pitches of the second lenses and the third lenses are substantially equal.

14. A display device according to claim 11, wherein the light path deflecting means deflects optical axes of light source light emitted to the display panel.

15. A display device according to claim 14, wherein the display panel is a liquid crystal display panel including liquid crystal molecules which are switched in an in-plane direction of the display panel.

16. A display device comprising:
a display panel having a predetermined effective display region;
a display screen having an image display region larger than the effective display region of the display panel;
a magnifying imaging optical system arranged between the display panel and the display screen and including a first inverting optical system constituted by a first lens array in which a plurality of first lenses corresponding to the display panel are arrayed and a second inverting optical system in which a plurality of second lenses corresponding to the first lenses are arrayed, the magnifying imaging optical system constituting a plurality of channels for forming on the display screen a magnified erect image for a display image on the display panel through the corresponding first and second lenses; and
deflecting means for deflecting optical axes of light emitted from the display panel in accordance with a magnification of the magnifying optical system, the first and second lenses being arranged along the optical axes deflected by the deflecting means.

17. A display device according to claim 16, wherein the deflecting means comprises one of a concave lens, a convex lens, a prism and a Fresnel lens.

18. A display device according to claim 16, further comprising second deflecting means, arranged between the magnifying imaging optical system and the display screen, for deflecting optical axes of light from the display panel.

19. A display device according to claim 18, wherein second deflecting means is one of a concave lens, a convex lens, a prism and a Fresnel lens.

20. A display device according to claim 16, wherein the first lenses of the first lens array respectively correspond to divided regions of the effective display region.

21. A display device comprising:
a display panel having a predetermined effective display region;
a display screen having an image display region larger than the effective display region of the display panel; and
a magnifying optical system arranged between the display panel and the display screen and including a first inverting optical system constituted by a first lens array in which a plurality of first lenses corresponding to the display panel are arrayed and a second inverting optical system constituted by a second lens array in which a plurality of second lenses corresponding to the first lenses are arrayed, the magnifying optical system constituting a plurality of channels for forming on the display screen a magnified erect image for a display image on the display panel through the corresponding first and second lenses,
a positional relationship of the first and second lenses being set so that arbitrary points on the display panel superpose each other on the display screen through the plurality of channels.

* * * * *